H. P. PIRTLE.
PATCH FOR TIRE CASINGS.
APPLICATION FILED MAY 6, 1918.
1,300,769.
Patented Apr. 15, 1919.
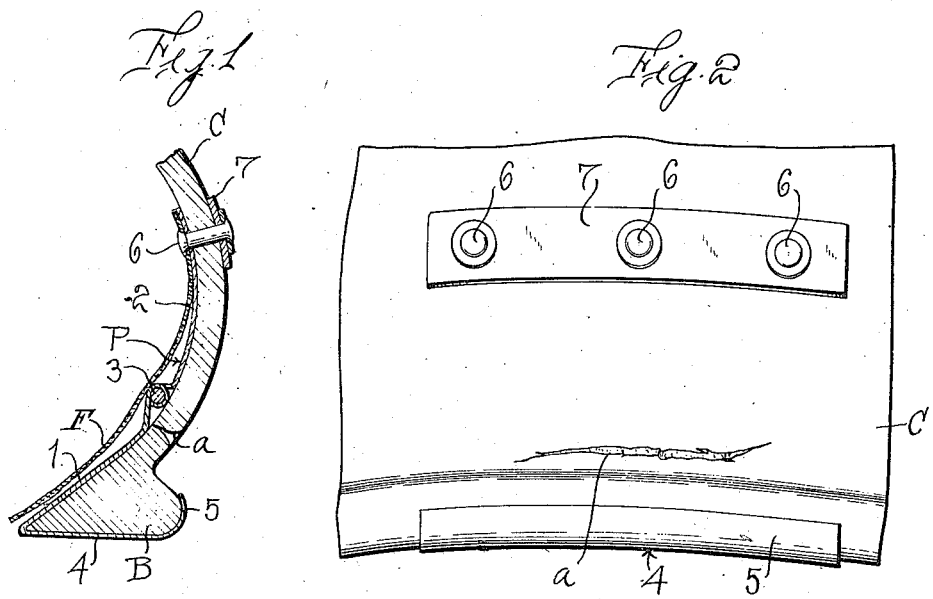
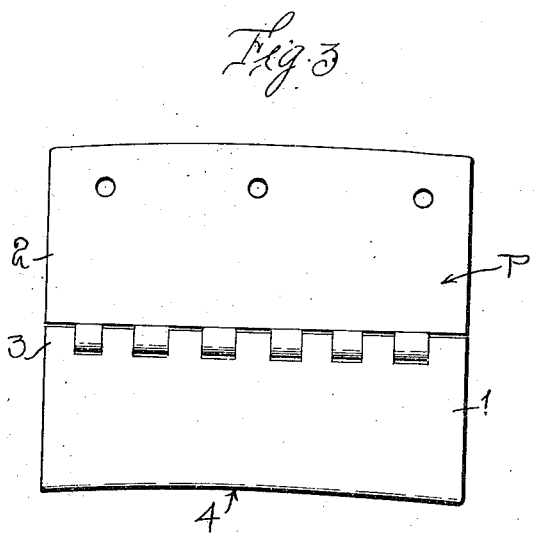
Inventor
Homer P. Pirtle
By Watson E. Coleman
Attorney

UNITED STATES PATENT OFFICE.

HOMER P. PIRTLE, OF WALTERS, OKLAHOMA.

PATCH FOR TIRE-CASINGS.

1,300,769.  Specification of Letters Patent.  Patented Apr. 15, 1919.

Application filed May 6, 1918. Serial No. 232,787.

*To all whom it may concern:*

Be it known that I, HOMER P. PIRTLE, a citizen of the United States, residing at Walters, in the county of Cotton and State of Oklahoma, have invented certain new and useful Improvements in Patches for Tire-Casings, of which the following is a specification, reference being had to the accompanying drawings.

This invention relates to certain improvements in patches for tire casings and it is an object of the invention to provide a patch of this general character having novel and improved means whereby it may be employed with convenience and facility in connection with rim cuts so that the life of the casing may be materially prolonged.

It is also an object of the invention to provide a novel and improved patch of this general character which is provided with bead engaging means and wherein said patch includes relatively movable plates so that no material obstruction or resistance will be offered to the flexing of the casing to which the patch may be applied.

The invention consists in the details of construction and in the combination and arrangement of the several parts of my improved patch whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary sectional view of a tire casing showing a patch constructed in accordance with an embodiment of my invention applied thereto;

Fig. 2 is a fragmentary view in side elevation of a tire casing showing certain features of my invention as herein disclosed; and Fig. 3 is a view in elevation of the inner face of my improved patch as herein set forth.

As herein disclosed C denotes a tire casing to which a patch P constructed in accordance with an embodiment of my invention is applied. As herein embodied the patch comprises two metallic plates 1 and 2 substantially rectangular in form and having adjacent longitudinal marginal portions hingedly connected as at 3 so that said plates when applied to the tire casing may have relative movement. As herein disclosed the plate 1 has its inner longitudinal margin defined by the laterally and outwardly directed flange 4 and the free marginal portion of the flange 4 is bent outwardly as at 5. The flange 4 and portion 5 thereof are adapted to snugly engage the head B of the casing C and the plates 1 and 2 are adapted to overlie the inner wall of the casing C. The plates 1 and 2 are of such a width as to extend beyond a rim cut $a$ in the casing C and the outer longitudinal marginal portion of the plate 2 is clamped to the casing C by the rivets 6 or the like. The rivets 6 or other fastening members are also disposed through a reinforcing or strengthening strip or strap 7 overlying the outer face of the casing C and extending in a direction circumferentially of the casing.

F denotes a textile flap or apron which is held to the outer longitudinal marginal portion of the plate 2 by the rivets 6 or the like and such flap or apron is of such dimension as to entirely overlie the inner face of the plates 1 and 2 so that the contact of the inner tube with the plates 1 and 2 is prevented.

In practice it has been demonstrated that a patch constructed in accordance with the present invention when applied to a casing provided with a rim cut permits such casing to be used with the same convenience and advantage as a new or perfect casing.

From the foregoing description, it is thought to be obvious that a patch constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A patch for a tire casing comprising hingedly connected plates adapted to overlie the inner face of a tire casing, one of said plates being provided with means engageable with the bead of the casing.

2. A patch for a tire casing comprising hingedly connected plates adapted to overlie the inner face of a tire casing, one of said plates being provided with means engageable with the bead of the casing, and means coacting with the other plate for anchoring the same to the casing.

3. A patch for a tire casing comprising hingedly connected plates adapted to overlie the inner face of a tire casing, one of said plates being provided with means engageable with the bead of the tire casing, and a flap overlying the inner faces of the plates and secured to the other of said plates.

In testimony whereof I hereunto affix my signature in the presence of two witnesses.

HOMER P. PIRTLE.

Witnesses:
W. S. WEIR,
W. E. SAWYER.